United States Patent [19]
Sorin et al.

[11] Patent Number: 6,088,491
[45] Date of Patent: Jul. 11, 2000

[54] OPTICAL CIRCULATOR

[75] Inventors: Wayne V. Sorin, Mountain View; Douglas M. Baney, Los Altos, both of Calif.

[73] Assignee: Agilent Technologies, Inc., Palo Alto, Calif.

[21] Appl. No.: 09/023,858

[22] Filed: Feb. 13, 1998

[51] Int. Cl.$^7$ ........................................... G02B 5/30
[52] U.S. Cl. ........................ 385/11; 359/483; 359/494
[58] Field of Search ................. 385/11, 18; 359/281, 359/484, 485, 497

[56] References Cited

U.S. PATENT DOCUMENTS

| | | | |
|---|---|---|---|
| 5,237,445 | 8/1993 | Kuzuta | 359/281 |
| 5,557,692 | 9/1996 | Pan et al. | 385/11 |
| 5,734,763 | 3/1998 | Chang | 385/11 |

*Primary Examiner*—Rodney Bovernick
*Assistant Examiner*—Ellen E. Kim

[57] ABSTRACT

An optical circulator having first, second, and third ports. The optical circulator includes a beam splitter and a plurality of Faraday stages. The beam splitter is connected to the first and third ports and separates a first light signal entering the first port into first and second outgoing light signals. The beam splitter also separates a second light signal entering the third port into third and fourth outgoing light signals. The first, second, third, and fourth outgoing light signals are spaced-apart from one another. The first and second outgoing light signals include, respectively, orthogonal polarization components from the first light signal, and the third and fourth outgoing light signals include, respectively, orthogonal polarization components from the second light signal. The Faraday stages, including a first Faraday stage and a last Faraday stage, being arranged in series. The first Faraday stage receives light from the beam splitter, and the last Faraday stage is positioned so as to provide light to the second port. The second port and the walk-off directions and directions of rotation of the Faraday stages are chosen such that light entering the first port exits the second port, light entering the second port exits the third port, and light entering the third port is prevented from exiting the first and second ports.

7 Claims, 6 Drawing Sheets

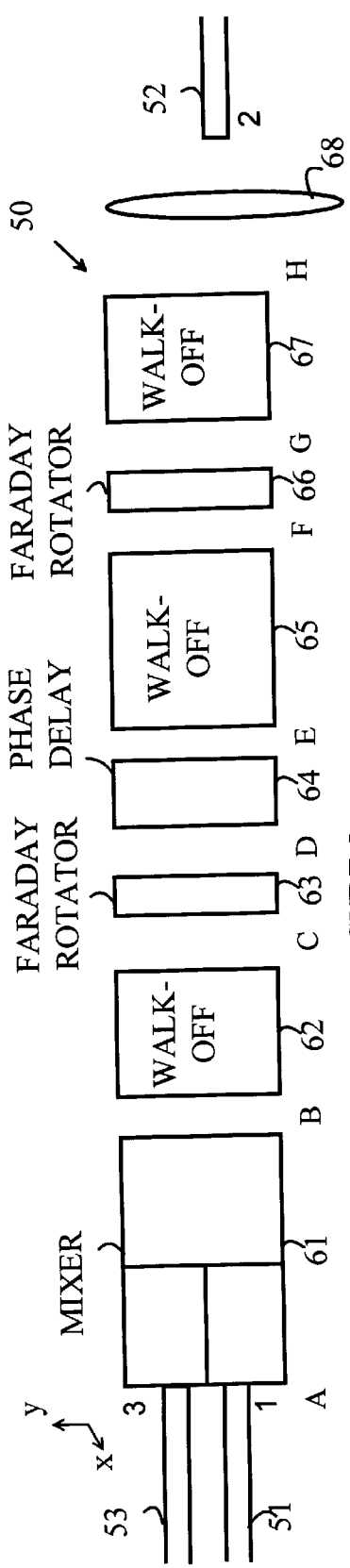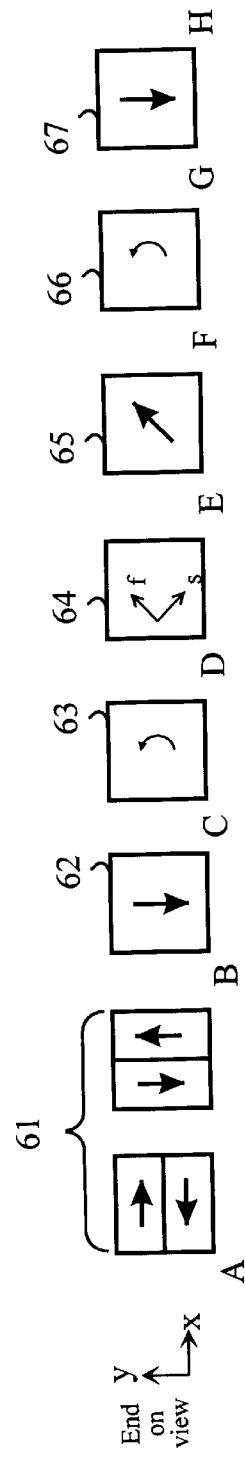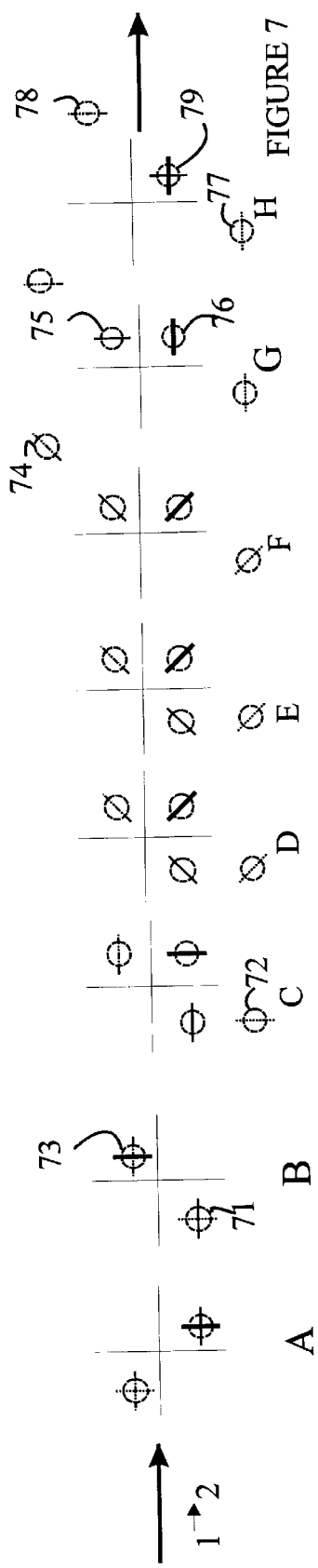
FIGURE 5
FIGURE 6
FIGURE 7

OPTICAL CIRCULATOR

FIELD OF THE INVENTION

The present invention relates to optical coupling devices, and more particularly, to an improved optical circulator.

BACKGROUND OF THE INVENTION

Communication networks based on optical signals have significantly greater bandwidth than those based on metallic couplers. An individual optical fiber operating at a single wavelength is capable of transmitting signals at 2.5 Gbit per second or higher. With the advent of wavelength division multiplexing, the capacity of such a fiber can be further increased by combining signals at different wavelengths into a single optical fiber.

To effectively utilize wavelength division multiplexing, narrow band filters are needed for separating the communications at a particular wavelength. The most promising narrow band filter is based on fiber Bragg reflectors. Since fiber Bragg reflectors are well known to the art, they will not be discussed in detail here. For the purpose of the present discussion, it is sufficient to note that a Bragg reflector may be viewed as a grating that has been induced in the core of an optical fiber. The grating consists of periodic alterations in the index of refraction of the core of the fiber. Such alterations may be induced by illuminating the core with a UV light pattern having regularly spaced maxima of sufficient intensity to damage the core. The pattern is typically generated by the interference of two UV light beams. When light having a wavelength twice the spacing of the grating strikes the grating, the light is reflected because of the coherent interference of the various partial reflections created by the alterations in the index of refraction of the fiber core. Reflection filters based on Bragg reflectors are relatively inexpensive.

Unfortunately, reflection filters are less than optimum for optical communications. In optical communication systems a transmission filter is more useful. To convert a reflection filter into a transmission filter, a three port optical circulator is typically utilized. An optical circulator has the property that light entering the $n^{th}$ port exits via the $(n+1)^{st}$ port. In a transmission filter based on a three port circulator, the reflection filter is connected to the second port. The light signal to be filtered is coupled to the first port. This signal leaves the second port and strikes the reflection filter which reflects light at the reflection wavelength back into the second port. This light then leaves the third port. Hence, the combination of the circulator and the reflection filter is functionally equivalent to a transmission filter connected between the first and third ports of the optical circulator.

While Bragg reflectors are relatively inexpensive, optical circulators are quite expensive. An optical circulator is several times the cost of a Bragg filter. Hence, to reduce the cost of a bandpass filter, less expensive optical circulators are needed.

Prior art optical circulators are constructed from a stack of crystal plates, which are coupled to optical fibers. A significant portion of the cost of a circulator is related to the cost of properly aligning the optical fibers to the stack of plates. Typically, each of the optical fibers must be separately aligned.

The stack of plates usually includes a number of Faraday rotators. Each Faraday rotator requires a separate magnet in these prior art designs. Accordingly, the size of the stack must be increased to make room for the magnets. The size of the plates is also increased by the need to include separate collimating lenses to couple the light from each of the fibers to the stack. The cost of the stack is related to the size of the plates; hence, designs that increase the size of the stack also increase the cost of the circulator.

Another problem with prior art circulators is the degree of isolation provided between the ports. As noted above, light entering the second port of an optical circulator is suppose to exit only through the third port. However, some of the light is routed out of the first port because the Faraday rotators do not function in an ideal manner.

Yet another problem with prior art circulators is the need to have a separate design for each wavelength window. If light differing substantially in wavelength from the design wavelength enters the circulator, the degree of isolation provided is decreased. Further, the fraction of the light entering a port that exits the correct port is reduced if the wavelength of the light is substantially different from the design wavelength. In future wavelength division multiplexed communication systems, a number of channels having different wavelengths will be present at any given time. Hence, a circulator must be able to operate with the necessary isolation and throughput over as wide a range of wavelengths as possible.

A still further problem with prior art optical circulators is the inability to reverse the direction of circulation electrically. In a typical communication network, a number of users communicate with one another over an optical fiber arranged in a loop by sending signals along the fiber in a predetermined direction. For example, in a telecommunications network each subscriber communicates with a central office over a fiber that is arranged in a ring with the subscriber and central office stations disposed along the ring. If the fiber is broken, communication between one or more of the users and the central office will be interrupted. In principle, these users can still communicate with the central office by sending messages along the uninterrupted portion of the loop. However, this requires that the direction of propagation along the fiber be reversed over a portion of the fiber.

Unfortunately, if the fiber ring includes an optical circulator, the direction of circulation of the signals in the circulator must be reversed. That is, light entering port 3 must now exit through port 2, and light entering port 2 must now exit via port 1. Prior art circulators do not include any method for providing this reversal of direction without including a separate switch to reroute the signals. The cost of such switches increases the cost of the optical circulator assembly, and hence, it would be advantageous to provide an optical circulator whose direction of circulation can be reversed by sending an appropriate signal to the circulator.

Broadly, it is the object of the present invention to provide an improved optical circulator.

It is a further object of the present invention to provide an optical circulator with a higher degree of isolation between the ports than prior art optical circulators.

It is yet another object of the present invention to provide an optical circulator that operates over a wider band of frequencies than prior art optical circulators.

It is a still further object of the present invention to provide an optical circulator that is less expensive to fabricate than prior art optical circulators.

It is another object of the present invention to provide an optical circulator in which the direction of circulation may be switched in response to an electrical signal.

These and other objects of the present invention will become apparent to those skilled in the art from the following detailed description of the invention and the accompanying drawings.

SUMMARY OF THE INVENTION

The present invention is an optical circulator having first, second, and third ports. The optical circulator includes a beam splitter and a plurality of Faraday stages. The beam splitter is connected to the first and third ports and separates a first light signal entering the first port into first and second outgoing light signals. The beam splitter also separates a second light signal entering the third port into third and fourth outgoing light signals. The first, second, third, and fourth outgoing light signals are spaced-apart from one another. The first and second outgoing light signals include, respectively, orthogonal polarization components from the first light signal, and the third and fourth outgoing light signals include, respectively, orthogonal polarization components from the second light signal. The Faraday stages, including a first Faraday stage and a last Faraday stage, being arranged in series. The first Faraday stage receives light from the beam splitter, and the last Faraday stage is positioned so as to provide light to the second port. The second port and the walk-off directions and directions of rotation of the Faraday stages are chosen such that light entering the first port exits the second port, light entering the second port exits the third port, and light entering the third port is prevented from exiting the first and second ports.

In the preferred embodiment of the present invention, each of the Faraday rotators rotates the polarization vector of light traveling therethrough in the same direction and shares a common magnetic field.

BRIEF DESCRIPTION OF THE DRAWINGS

FIGS. 5–9 illustrate one embodiment of an optical circulator according to the present invention and the manner in which the various light components are processed by the elements of this embodiment.

DETAILED DESCRIPTION OF THE INVENTION

Figure 1:
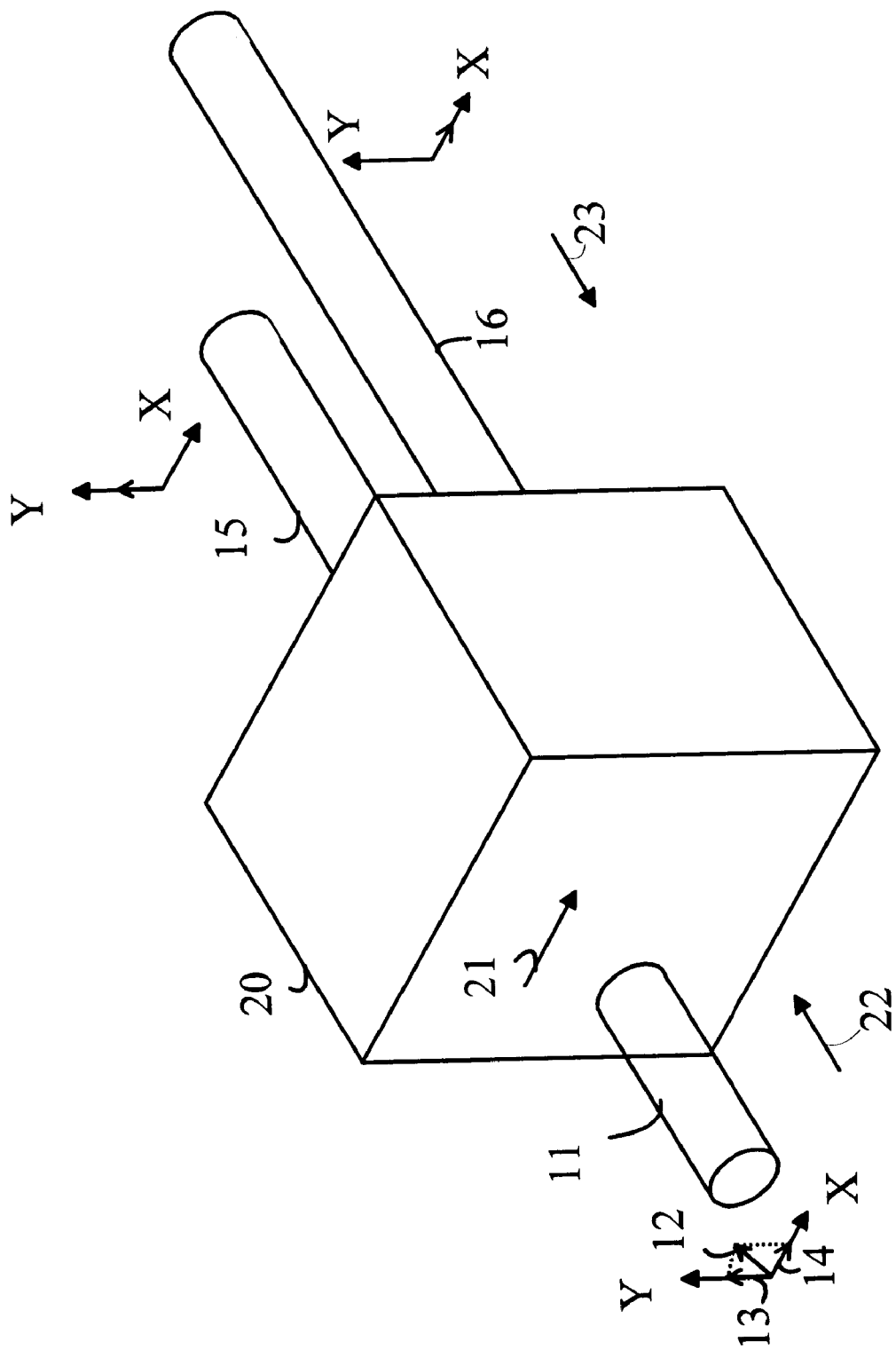
FIG. 1 illustrates the manner in which a walk-off crystal separates a beam of light into two beams.

The present invention may be more easily understood in terms of two elementary optical elements, a walk-off crystal, and a Faraday rotator. Refer to FIG. 1 which illustrates the manner in which a walk-off crystal 20 separates a beam of light 11 travelling in the direction shown by arrow 22 into two beams 15 and 16. In general, walk-off crystal 20 has a direction 21 defined by the crystal structure, which will be referred to as the "walk-off" direction in the following discussion. This direction may be used to define a coordinate system. The polarization vector 12 of the incoming light beam 11 may be resolved into orthogonal components 13 and 14 with respect to this coordinate system. Component 14 is parallel to the walk-off direction, and component 13 is orthogonal to the walk-off direction. Light having a polarization direction parallel to that of the walk-off direction is displaced in the walk-off direction, and hence, is separated into a beam 16 by the walk-off crystal. The light in beam 16 has a polarization that is parallel to the walk-off direction. Light having a polarization orthogonal to the walk-off direction is not displaced. This light forms a beam that is coincident with the original beam and has a polarization orthogonal to the walk-off direction. The displacement provided by the walk-off crystal is a function of the thickness of the crystal and the particular material from which it is constructed. Materials for constructing walk-off crystals are well known to the art, and hence, will not be discussed in detail here.

It should be noted that for a light beam travelling in the reverse direction the walk-off direction is reversed. That is, a light beam travelling in the direction shown by arrow 23 walks off in a direction opposite to that shown by arrow 21.

Figure 4:
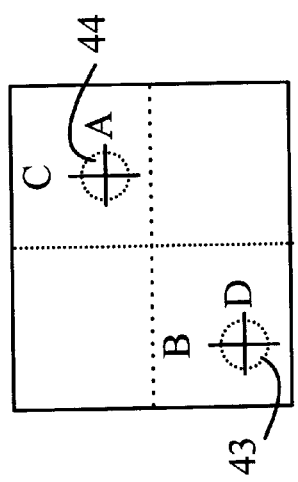
FIGS. 2–4 illustrate the manner in which four walk-off crystals are combined to form a polarization mixer.
Figure 3:
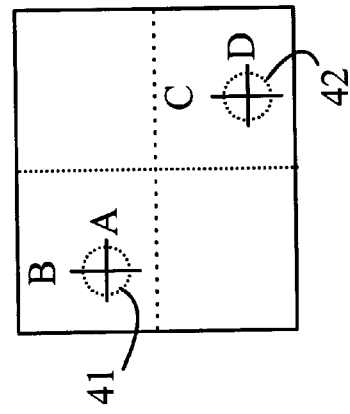
Figure 2:
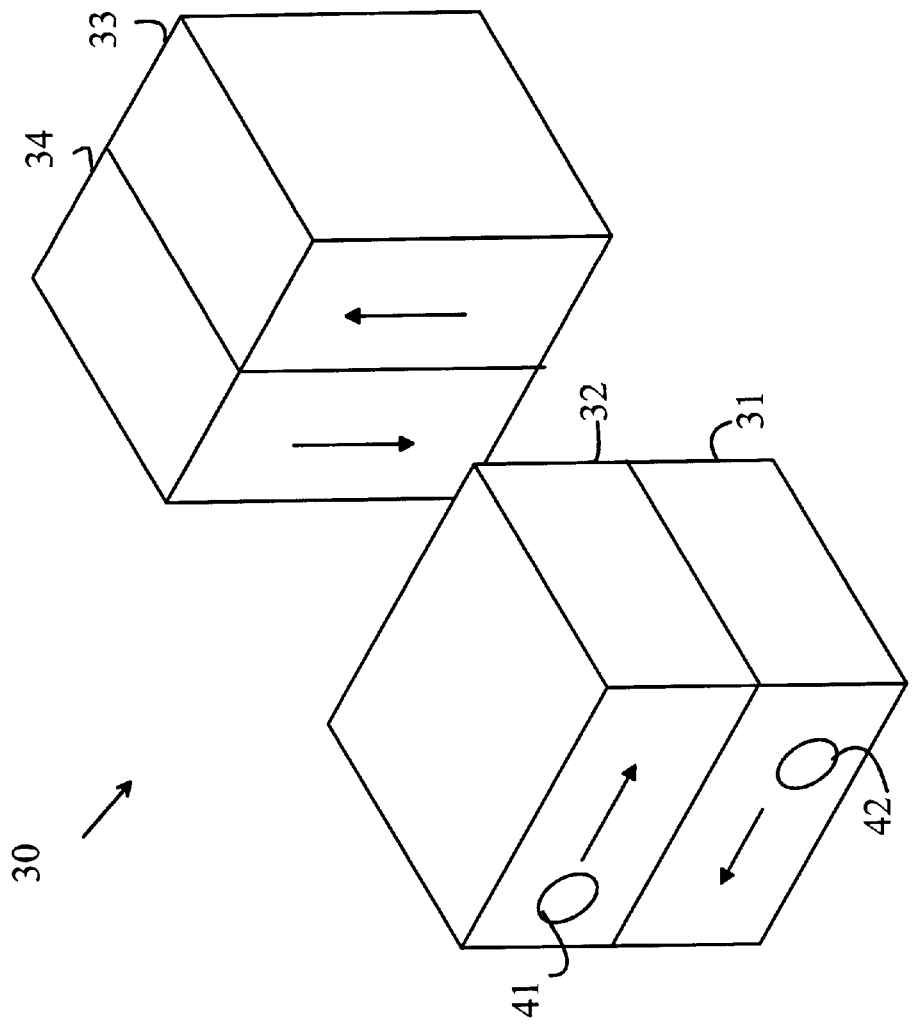

Four walk-off crystals may be combined to form an element referred to as a polarization mixer in the following discussion. A polarization mixer generates two new light beams from two incident light beams. The two new light beams are displaced in space relative to the incident light beams. Each of the two new beams includes one polarization component from each of the incident beams. One arrangement of walk-off crystals that results in a polarization mixer is illustrated in FIGS. 2–4. FIG. 2 shows the arrangement of four walk-off crystals 31–34 relative to the two incident beams 41 and 42. FIG. 3 is an end view of walk-off crystals 31 and 32 showing the polarization vectors of the incident beams. FIG. 4 is a view of the resultant light beams, as they would appear on a screen placed behind walk-off crystals 33 and 34. FIG. 4 shows the final two beams 43 and 44 and the polarization components that are combined to make these beams. It should be noted that the final beams displaced in space relative to the incident beams are constructed from polarization components derived from each of the incident beams.

The second elementary optical element utilized in the present invention is a Faraday rotator. A Faraday rotator is an element that is composed of an optically active compound such as yttrium-iron-garnet $Y_3Fe_5O_{12}$ which turns the direction of the polarization vector of the light passing therethrough by an angle of 45°. The direction of rotation is determined by the direction of an applied magnetic field. The direction of rotation of the polarization vector is independent of the direction of travel of the light through the element. By altering the direction of the magnetic field, the rotation of the polarization vector changes from 45° to −45° independent of the direction of travel of the light through the device. As will be explained in more detail below, embodiments of the present invention, in which the direction of circulation of the optical circulator is reversible, the direction of the magnetic field in the Faraday rotators is determined by an external signal.

It should be noted that a Faraday rotator only provides a precise 45° rotation for a specific wavelength and temperature. If the wavelength of the incident light is different from the design wavelength, or the Faraday rotator is operated at a temperature that differs from the design temperature, the angle of rotation will differ slightly from 45°. The significance of this deviation will be discussed in detail below.

The manner in which the above-described elements are combined to provide an optical rotator will now be discussed with reference to FIGS. 5–9. Refer first to FIG. 5, which is a block diagram of an optical circulator 50 according to the present invention. The three ports of the optical circulator are labeled 1–3. In the configuration shown in FIG. 5, light entering port 1 exits via port 2, and light entering port 2 exits via port 3. Any light entering port 3 is lost.

Ports 1 and 3 are coupled to thermally expanded core (TEC) optical fibers 51 and 53, respectively. TEC fibers are fabricated by heating the end of a fiber to cause the core dopants to diffuse and increase the core size of the fiber. This results in a larger diameter optical beam that emerges from the fiber end and therefore having a smaller divergence angle. The TEC optical fibers provide the collimation needed to expand the light beam from the cores of the fibers onto polarization mixer 61. These fibers are preferred, since such fibers provide the coupling function without requiring a collimating or imaging lens. As a result, the dimensions of optical circulator 50 can be significantly reduced. As noted above, the cost of an optical circulator is related to the size of the components. Hence, the use of the TEC fibers reduces the fabrication cost. Port 2 is coupled to an optical fiber 52.

Light entering port 1 passes through a stack of optical crystals consisting of a polarization mixer 61, a walk-off crystal 62, a Faraday rotator 63, a differential time delay crystal 64, a second walk-off crystal 65, a second Faraday rotator 66 and a third walk-off crystal 67. The light exiting walk-off crystal 67 is focused into fiber 52 attached to port 2 by lens 68.

The manner in which light entering port 1 arrives at port 2 while light entering port 3 is eliminated may be more easily understood with reference to FIGS. 6 and 7. FIGS. 6A–H are end views of the optical crystals as seen by a viewer looking end-on at the stack from the left hand side of the figure at the locations shown in FIG. 5 at A–H, respectively. The arrows indicate the walk-off directions in the relevant crystals as seen by a light beam travelling in the direction from port 1 to port 2. The arrows shown in the Faraday rotators indicate the direction of rotation of a polarization vector as the light passes through the Faraday rotator.

Differential time delay crystal 64 equalizes the time delay for the polarization components of the light from port 1. The arrow marked "f" indicates the polarization direction for which light travels fastest through the crystal. The arrow marked "s" indicates the polarization direction for which light travels slowest through the crystal.

Refer now to FIG. 7, which illustrates the movement of the various polarization components through optical circulator 50. FIGS. 7A–H show the polarization components and beam positions as would be seen if a screen were placed between the optical crystals at the locations shown in FIG. 5 at A–H, respectively. The two orthogonal polarization components of the light entering port 1 are shown as solid lines, the y-component being shown as a thick line, while the x-component is shown as a thin line. The two orthogonal polarization components of the light entering port 3 are shown as dashed lines of different dash patterns.

Refer now to FIG. 7B, the y-component of the light from port 3 has been moved to the position 71 upon leaving mixer 61. Walk-off crystal 62 moves this component to a location shown at 72. It is assumed that the dimensions of the crystals are sufficiently large that the component remains within the crystals. The component shown at 72 eventually exits the crystal stack at the location shown at 77. Lens 68 is set to focus light from position 79 into fiber 52. Hence, light from position 77 cannot enter fiber 52 since it is not imaged onto the fiber core. Accordingly, the y-component of light entering port 3 is eliminated.

The light from the x-component of the light entering port 3 is moved to position 73 shown in FIG. 7B, and remains in this location after walk-off crystal 62, since walk-off crystal 62 does not move polarization components that are parallel to the x-direction. Faraday rotator 63 rotates all of the polarization components through 45° in the counterclockwise direction, as shown in FIG. 7D. This configuration is not altered by differential time delay crystal 64; hence, the configuration is the same at locations D and E. Walk-off crystal 65 then walks all of the components at 45° to the x-axis upward and to the right as shown in FIG. 7F. As a result, the remaining component of the light from port 3 is moved to the position shown at 74 which is assumed to still be within the crystal stack. This component is processed by the remaining crystals and finally exits the stack at the location shown at 78. As noted above, light from this position will also miss fiber 52 since lens 68 only images light from position 79 into fiber 52. Accordingly, light from port 3 cannot traverse the optical circulator and exit via port 2.

Light from port 1 does leave by port 2. Referring to FIG. 7F again, after walk-off crystal 65, the two components of the light from port 1 are rotated back to directions parallel to the x and y-axis by Faraday rotator 66 as shown in FIG. 7G. The components are then recombined by walk-off crystal 67, which walks the component shown at 75 to the location of the component shown at 76. Lens 68 is positioned to focus light from this position into fiber 52.

Figure 8:
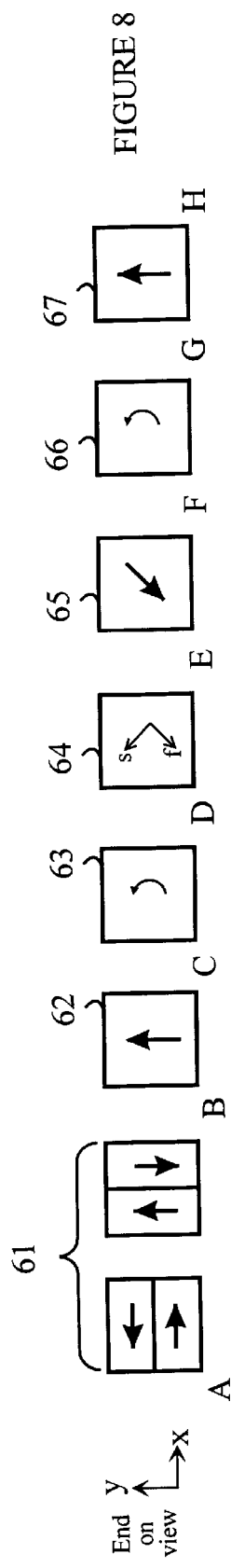
Figure 9:
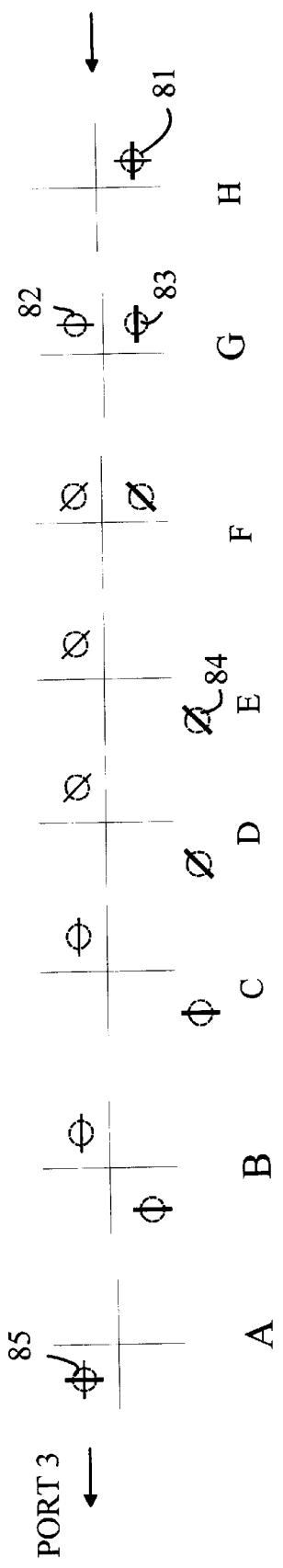

The manner in which light entering port 2 via fiber 52 is directed to fiber 53 attached to port 3 may be more easily understood with reference to FIGS. 8 and 9. FIGS. 8 and 9 are analogous to FIGS. 6 and 7 discussed above. However, the arrows indicating the direction of walk-off have been reversed in FIG. 8 to account for the direction of travel of the light. FIG. 9 illustrates the movement of the various polarization components through optical circulator 50. FIGS. 9A–H shows the polarization components and beam positions as would be seen if a screen were placed between the optical crystals at the locations shown in FIG. 8 at A–H, respectively. Light entering via port 2 is transformed by lens 68 to form a beam at the position 81. Walk-off crystal 67 separates the components of this light signal into vertical and horizontal components as shown at 82 and 83, respectively. Faraday rotator 66 rotates the separated components through 45° in the counterclockwise direction. As noted above, the direction of rotation of a Faraday rotator is independent of the direction of travel of the light. Walk-off crystal 65 moves the horizontal component to position 84, which is still within the crystal stack. Faraday rotator 63 rotates the components through another 45° and walk-off crystal 62 moves the horizontal component into position for polarization mixer 61 to recombine the components at position 85 which corresponds to port 3.

It should be noted that optical circulator 50 includes two Faraday rotators having the same direction of rotation. Hence, the magnetic field applied to each rotator is the same. Accordingly, the two Faraday rotators can share the same magnet. Since the other optical components are insensitive to magnetic fields, the magnet can be placed over the entire device. Accordingly, the space needed for the Faraday rotators is only that needed for the crystals. This allows an optical circulator according to the present invention to be constructed with much smaller physical dimensions than prior art optical circulators in which the Faraday rotators have opposite directions of rotation, and hence, require two separate magnets and sufficient spacing to prevent the magnetic fields from interfering with one another.

Another aspect of the present invention that reduces the size of the optical circulator is the use of thermally expanded core (TEC) fibers for coupling to ports 1 and 3. The fibers can be aligned with respect to one another in V-shaped grooves, for example, constructed in crystalline silicon. The aligned fibers are then placed against the mixer and the rest of the crystals in the stack, which form a single unit. A small error in the relative alignment of the two fibers and the crystal assembly leads to an error in the location at which the light exits at port 2. Hence, the only manual alignment that is needed is to position port 2 and lens 68 after the fibers for ports 1 and 3 are bonded to the crystal assembly. In contrast, prior art optical circulators that utilize conventional fibers and collimating lenses for all of the ports require two or more alignment operations. The cost of aligning the optics is a significant fraction of the cost of the optical circulator; hence, the present invention is significantly less expensive than such prior art devices.

The optical circulator shown in FIG. 5 is referred to as a two-stage circulator as it includes two assemblies consisting of a Faraday rotator followed by a walk-off crystal. In the following discussion, a stage comprising a Faraday rotator and a walk-off crystal will be referred to as a Faraday stage. It should be noted that a Faraday stage might include other elements in addition to the Faraday rotator and walk-off crystal. For example, a Faraday stage may include phase delay elements or wave plates. As noted above, Faraday rotators only provide a precise 45° rotation for one wavelength at one temperature. At other wavelengths and temperatures, the rotation differs slightly from 45°. Denote the error in the rotation angle by $\Delta\Theta$. It can be shown that the degree of isolation provided between ports 1 and 3 is proportional to $\sin^{-2n}\Delta\Theta$, where n is the number of Faraday stages. The transmission of the optical circulator can be shown to be proportional to $\cos^{-2n}\Delta\Theta$. Since $\cos^{-2n}\Delta\Theta$ is a very slowly changing function for errors near 0, it is advantageous to utilize several stages to assure good isolation, since the penalty in transmission is small.

The preferred embodiment of the present invention utilizes three stages. The additional stages provide a number of advantages. First, as noted above, the isolation provided is greater than two-stage optical circulators. Second, the differential time delay crystal shown at 64 in FIG. 5 is not needed in the preferred three-stage device. Finally, as will be explained in more detail below, the bandwidth accommodated by the optical circulator can be increased by mistuning the Faraday rotators so that each provides the 45° rotation at a slightly different wavelength.

Figure 10:
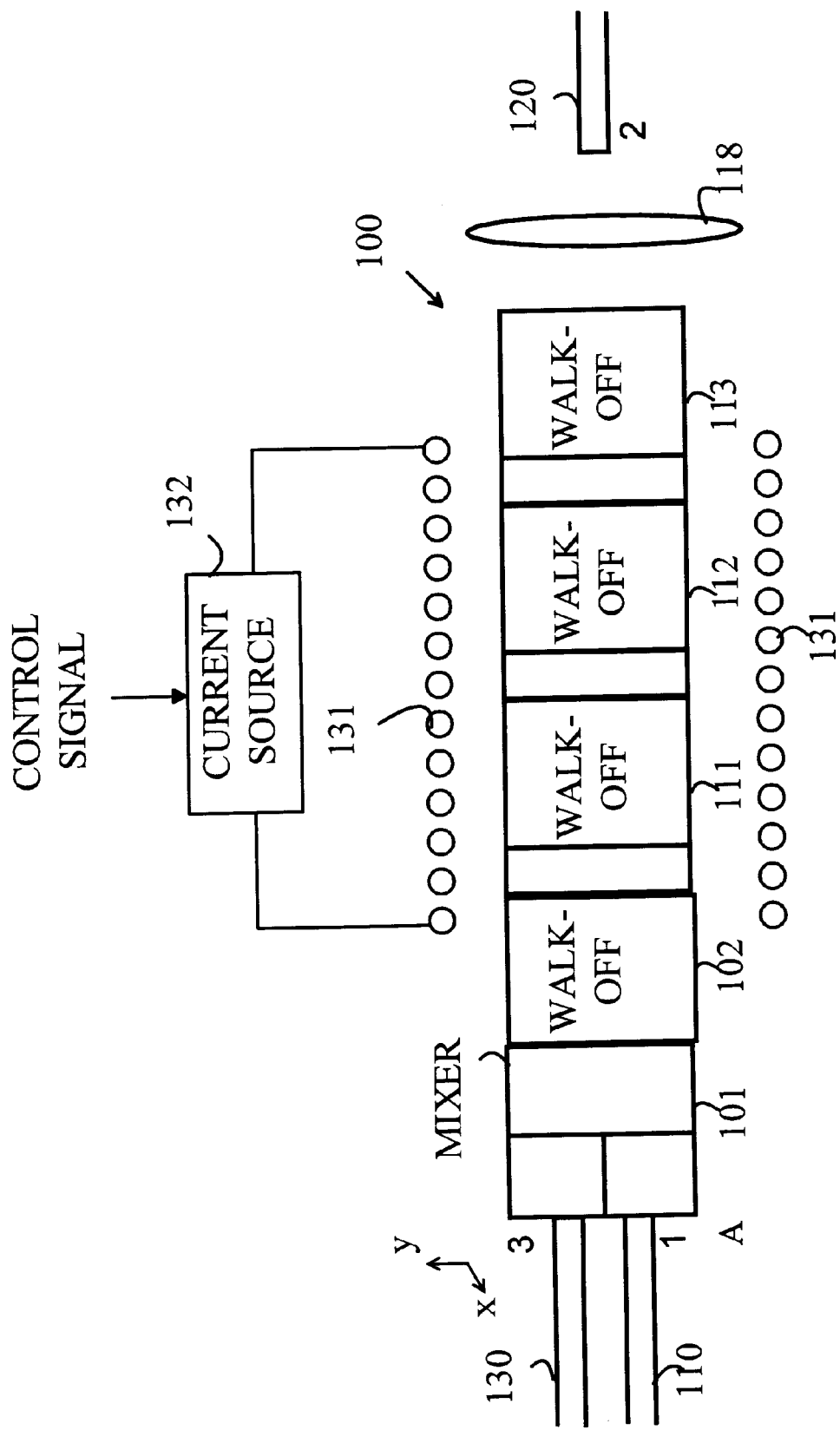
FIG. 10 is a block diagram of one preferred embodiment of the present invention.
Figure 11:
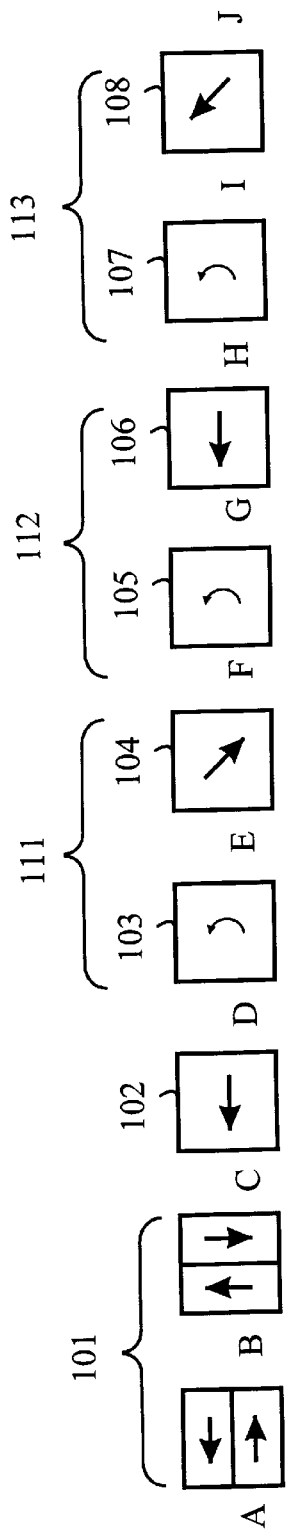
FIGS. 11–13 illustrate the manner in which the various light components are processed by the elements of the preferred embodiment shown in FIG. 10.
Figure 12:
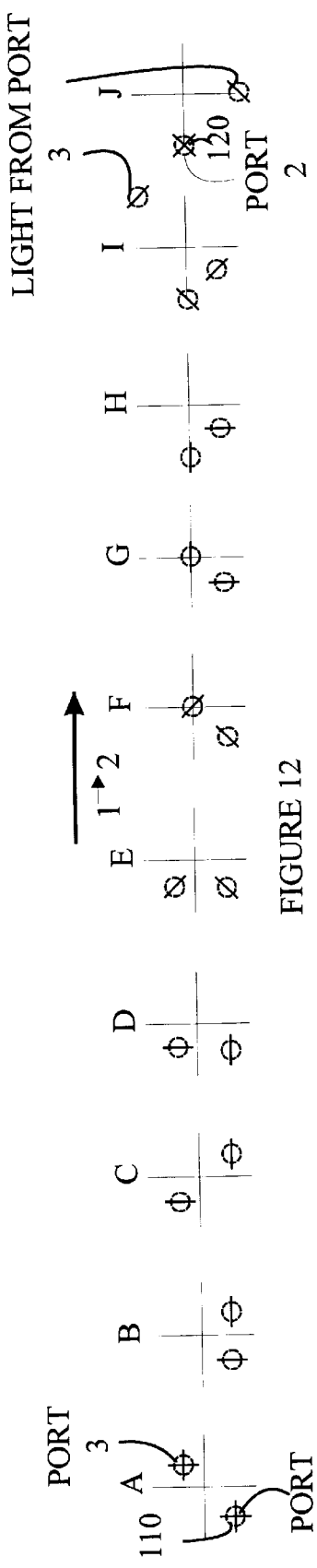
Figure 13:
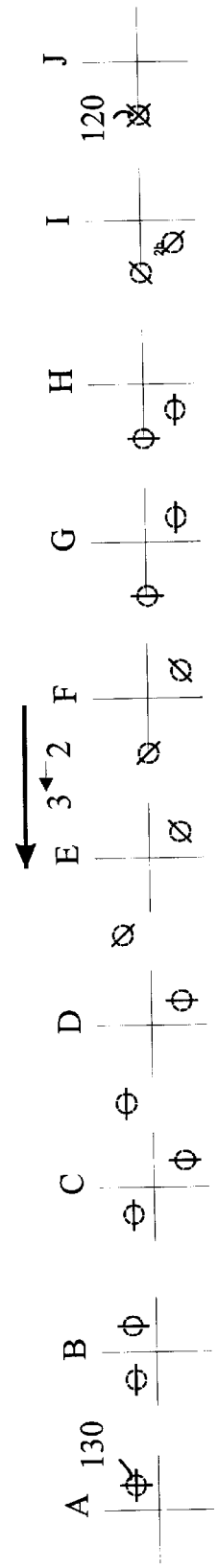

Refer now to FIGS. 10–13, which illustrate the preferred embodiment of the present invention. FIG. 10 is a side view of optical circulator 100. A FIG. 11 is a block diagram of the crystals in the crystal stack of the optical circulator as seen in end-on views from ports 1 and 3. FIG. 11 is analogous to FIG. 6 discussed above. The crystal stack consists of a polarization mixer 101, a walk-off crystal 102, and three Faraday stages 111–113. Faraday stage 111 comprises Faraday rotator 103 and walk-off crystal 104. Faraday stage 112 comprises Faraday rotator 105 and walk-off crystal 106, and Faraday stage 113 comprises Faraday rotator 107 and walk-off crystal 108. The arrows associated with the walk-off crystals represent the direction of walk-off for light travelling from port 1 or port 3 to port 2.

FIGS. 12A–J show the positions of the various polarization components for light entering port 1 as would be seen on screens located at locations A–J shown in FIG. 11, respectively. To simplify the drawings, only the beginning and final position of the light entering port 3 is shown. The light entering port 1 is shown at 110. The final position of this light is shown at 120. It should be noted that the distances traversed by each of the polarization components of the light entering port 1 is the same. Accordingly, this embodiment of the present invention does not require a differential time delay crystal.

FIGS. 13A–J show the positions of the various polarization components for light entering port 2 at position 120 as would be seen by the screens located at locations A–J in FIG. 11, respectively. In tracing the path of the various components, it must be remembered that the direction of walk-off in traversing the stack from the reverse direction is reversed for each of the walk-off crystals shown in FIG. 11.

It should be noted again that all of the Faraday rotators rotate the polarization of the light in the same direction. Hence, all of the Faraday rotators in this embodiment of the present invention share the same magnet. In this embodiment, the magnetic field is generated by passing a current through coil 131, although a magnet would be used in an embodiment in which the direction of circulation is fixed. The direction of the current, and hence, the magnetic field is determined by a control signal received by current source 131. As noted above, the use of a single magnet reduces the thickness of the stack substantially.

It should also be noted that reversing the direction of the magnetic field results in the direction of circulation in optical circulator 100 being reversed. That is, light entering port 3 now exits by port 2 and light entering port 2 exits via port 1. Hence, the present invention also provides a reversible optical circulator.

It should also be noted that optical circulator 100 may also be used as an optical switch. As seen from port 2, optical circulator 100 directs light either to port 1 or port 3 depending on the direction of the magnetic field applied to the Faraday rotators in optical circulator 100.

While the above-described embodiments of the present invention utilized a coil for generating the magnetic field that is shared by the Faraday rotators, other methods for providing a switchable magnetic field will be apparent to those skilled in the art from the above discussion. For example, embodiments in which the magnetic field generator utilizes a latching material may also be employed in the present invention. In such embodiments a current pulse sets the direction of magnetization. The direction remains the same until another current pulse is applied. Similarly, a permanent magnet together with a device for flipping the direction of the magnet in response to a control signal could also be utilized.

As noted above, it is advantageous to maximize the range of input wavelengths over which optical circulator 100 functions. Since optical circulator 100 has three stages, the degree of isolation from ports 2 to 1 is sufficiently high to allow some of the isolation to be given up to attain a broader range of isolation for wavelengths off of the design wavelength. The trade-off is accomplished by utilizing Faraday rotators that rotate light through slightly different angles at the design frequencies over which the optical circulator is to operate. This has the effect of broadening the isolation response as a function of input wavelength, while only slightly decreasing the transmission response.

It should be noted that the above embodiments of the present invention have utilized a polarization mixer followed by a walk-off crystal as the input stage for ports 1 and 3. As can be seen from FIG. 7C, this combination of elements separates the two incoming beams from ports 1 and 3 into four outgoing beams, which are mutually separated in space. The first and second outgoing beams contain, respectively, the orthogonal polarization components of the first input beam, and the second and third outgoing beams contain, respectively, the orthogonal polarization components of the second input beam. While the combination of a polarization mixer and a walk-off crystal is the preferred embodiment for such a beam splitter, other arrangements of crystals may also be utilized to achieve the same separation.

Various modifications to the present invention will become apparent to those skilled in the art from the foregoing description and accompanying drawings. Accordingly, the present invention is to be limited solely by the scope of the following claims.

What is claimed is:

1. An optical circulator comprising:

a first port comprising a first optical fiber;

a second port;

a third port comprising a second optical fiber;

a beam splitter connected to said first and third ports for separating a first light signal entering said first port into first and second outgoing light signals and for separating a second light signal entering said third port into third and fourth outgoing light signals, said first and third outgoing light signals being spaced-apart from said second and fourth outgoing light signals, said first and second outgoing light signals comprising, respectively, orthogonal polarization components from said first light signal, and said third and fourth outgoing light signals comprising, respectively, orthogonal polarization components from said second light signal, said beam splitter comprising a first pair of beam splitting walk-off crystals comprising a first splitting walk-off crystal having a first walk-off direction and a second beam splitting walk-off crystal having a second walk-off direction, said first walk-off direction being opposite to that of said second walk-off direction, said first optical fiber of said first port being connected to said first walk-off crystal and said second optical fiber of said third port being connected to said second walk-off crystal, said beam splitter further comprising a second pair of beam splitting walk-off crystals comprising a third splitting walk-off crystal having a third walk-off direction and a fourth beam splitting walk-off crystal having a fourth walk-off direction, said third walk-off direction being opposite to that of said fourth walk-off direction, and said first and second walk-off directions being orthogonal to said third and fourth walk-off directions;

a plurality of Faraday stages including a first Faraday stage and a last Faraday stage, said Faraday stages being arranged in series, said first Faraday stage receiving light from said beam splitter and said last Faraday stage being positioned so as to provide light to said second port, wherein each Faraday stage comprises a Faraday rotator and a walk-off crystal, each Faraday rotator being characterized by a direction of rotation and each walk-off crystal being characterized by a walk-off direction, and wherein said second port and said walk-off directions and directions of rotation of said Faraday stages are chosen such that light entering said first port exits said second port, light entering said second port exits said third port, and light entering said third port is prevented from exiting said first and second ports.

2. The optical circulator of claim 1 wherein each of said Faraday rotators rotates the polarization vector of light traveling therethrough in the same direction.

3. The optical circulator of claim 2 wherein said optical circulator comprises a common magnetic field generator that provides a magnetic field that is shared by each of said Faraday rotators.

4. The optical circulator of claim 3 wherein said magnetic field generator sets the direction of said magnetic field in response to a control signal.

5. The optical circulator of claim 1 wherein at least one of said Faraday rotators rotates the polarization vector of light passing therethrough by an angle that is different from the angle through which another of said Faraday rotators rotates the polarization vector of light passing through that Faraday rotator.

6. The optical circulator of claim 1 wherein the number of Faraday stages is greater than 2.

7. The optical circulator of claim 1 further comprising a differential time delay crystal for equalizing the optical paths traversed by said first and second orthogonal polarization components of said first light signal in traversing said optical circulator to reach said second port.

* * * * *